US012438950B2

United States Patent
Shen (10) Patent No.: US 12,438,950 B2
(45) Date of Patent: Oct. 7, 2025

(54) DISPLAY METHOD, RELATED DEVICE, AND NON-TRANSITORY READABLE STORAGE MEDIUM

(71) Applicant: VIVO MOBILE COMMUNICATION CO., LTD., Dongguan (CN)

(72) Inventor: Xiaogang Shen, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 55 days.

(21) Appl. No.: 18/512,594

(22) Filed: Nov. 17, 2023

(65) Prior Publication Data

US 2024/0089331 A1 Mar. 14, 2024

Related U.S. Application Data

(63) Continuation of application No. PCT/CN2022/094103, filed on May 20, 2022.

(30) Foreign Application Priority Data

May 20, 2021 (CN) .......................... 202110552894.5

(51) Int. Cl.
*H04L 67/146* (2022.01)
*H04L 51/043* (2022.01)

(52) U.S. Cl.
CPC .......... *H04L 67/146* (2013.01); *H04L 51/043* (2013.01)

(58) Field of Classification Search
CPC ..... H04L 67/146; H04L 51/043; H04L 51/04; H04L 51/046; H04L 51/216

USPC ......................................................... 709/231
See application file for complete search history.

(56) References Cited

U.S. PATENT DOCUMENTS

| | | | | |
|---|---|---|---|---|
| 9,313,160 | B1* | 4/2016 | Shamis | H04L 51/216 |
| 11,431,667 | B2* | 8/2022 | Zhang | H04L 51/234 |
| 11,616,829 | B2* | 3/2023 | Choi | H04L 63/10 |
| | | | | 709/206 |
| 2017/0134323 | A1* | 5/2017 | Alexander | H04L 51/216 |
| 2018/0095940 | A1* | 4/2018 | Meixner | H04L 51/046 |
| 2018/0198831 | A1* | 7/2018 | Calcaterra | H04L 43/20 |

(Continued)

FOREIGN PATENT DOCUMENTS

| | | |
|---|---|---|
| CN | 102917139 A | 2/2013 |
| CN | 105991419 A | 10/2016 |

(Continued)

*Primary Examiner* — Karen C Tang
(74) *Attorney, Agent, or Firm* — The Webb Law Firm (57) ABSTRACT

A display method includes obtaining P pieces of state information corresponding to P sessions in a communication application; and displaying P session identifiers corresponding to the P sessions on a first interface of the communication application according to the P pieces of state information. A display manner of each session identifier is associated with state information of a session corresponding to the session identifier. The state information of the session is used to represent a state of a chat dialogue in the session. The state information of the session includes first state information and second state information, the first state information is used to represent that the chat dialogue in the session is in an incomplete state, and the second state information is used to represent that the chat dialogue in the session is in a completed state. P is an integer greater than 1.

20 Claims, 5 Drawing Sheets

(56) References Cited

U.S. PATENT DOCUMENTS

2018/0287982 A1* 10/2018 Draeger ................ H04L 51/216
2023/0208662 A1*  6/2023 Choi ..................... H04L 67/535
                                                        709/204

FOREIGN PATENT DOCUMENTS

| CN | 110324230 A | 10/2019 |
| CN | 111030922 A |  4/2020 |
| CN | 111078065 A |  4/2020 |
| CN | 111343081 A |  6/2020 |
| CN | 111984115 A | 11/2020 |
| CN | 112003778 A | 11/2020 |
| CN | 112073293 A | 12/2020 |
| CN | 112565527 A |  3/2021 |
| CN | 112612395 A |  4/2021 |
| CN | 113300941 A |  8/2021 |
| WO | 2018094572 A1 | 5/2018 |
| WO | 2020024455 A1 | 2/2020 |
| WO | 2020199840 A1 | 10/2020 |

* cited by examiner

DISPLAY METHOD, RELATED DEVICE, AND NON-TRANSITORY READABLE STORAGE MEDIUM

CROSS-REFERENCE TO RELATED APPLICATIONS

This application is a Bypass Continuation Application of International Patent Application No. PCT/CN2022/094103 filed May 20, 2022, and claims priority to Chinese Patent Application No. 202110552894.5 filed May 20, 2021, the disclosures of which are hereby incorporated by reference in their entireties.

BACKGROUND OF THE INVENTION

Field of the Invention

Embodiments of this application relate to the field of communication technologies, and in particular, to a display method, a related device, and a non-transitory readable storage medium.

Description of Related Art

With development of communication technologies, electronic devices are increasingly widely used, and more and more users chat with contacts by using a session of a communication application in the electronic device.

SUMMARY OF THE INVENTION

According to a first aspect, an embodiment of this application provides a display method, including:
  obtaining P pieces of state information corresponding to P sessions in a communication application, where P is an integer greater than 1; and
  displaying P session identifiers corresponding to the P sessions on a first interface of the communication application according to the P pieces of state information, where
  a display manner of each session identifier is associated with state information of a session corresponding to the session identifier; and the state information of the session is used to represent a state of a chat dialogue in the session, the state information of the session includes first state information and second state information, the first state information is used to represent that the chat dialogue in the session is in an incomplete state, and the second state information is used to represent that the chat dialogue in the session is in a completed state.

According to a second aspect, an embodiment of this application further provides a display apparatus, including:
  an obtaining module, configured to obtain P pieces of state information corresponding to P sessions in a communication application, where P is an integer greater than 1; and
  a display module, configured to display P session identifiers corresponding to the P sessions on a first interface of the communication application according to the P pieces of state information, where
  a display manner of each session identifier is associated with state information of a session corresponding to the session identifier; and the state information of the session is used to represent a state of a chat dialogue in the session, the state information of the session includes first state information and second state information, the first state information is used to represent that the chat dialogue in the session is in an incomplete state, and the second state information is used to represent that the chat dialogue in the session is in a completed state.

According to a third aspect, an embodiment of this application further provides an electronic device. The electronic device includes a processor, a memory, and a program or an instruction stored in the memory and executable on the processor, and when the program or the instruction is executed by the processor, the display method in the first aspect is implemented.

According to a fourth aspect, an embodiment of this application further provides a non-transitory readable storage medium. A program or an instruction is stored in the non-transitory readable storage medium, and when the program or the instruction is executed by a processor, the display method in the first aspect is implemented.

According to a fifth aspect, an embodiment of this application provides a chip. The chip includes a processor and a communication interface, the communication interface is coupled to the processor, and the processor is configured to run a program or an instruction to implement the method in the first aspect.

According to a sixth aspect, a computer program product is provided. The computer program product is stored in a non-transient storage medium, and the computer program product is executed by at least one processor to implement the method in the first aspect.

According to a seventh aspect, a communication device is provided, and is configured to perform the method in the first aspect.

BRIEF DESCRIPTION OF THE DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a display method provided in the embodiments of this application is described in detail by using some embodiments and application scenarios thereof.

There is at least the following problem in the existing chat scenario: if a user forgets to reply information about a contact, the user can find out and reply only when the user re-enters a chat interface of a session with the contact. It can be learned that session processing efficiency in the existing chat scenario is low.

Figure 1:
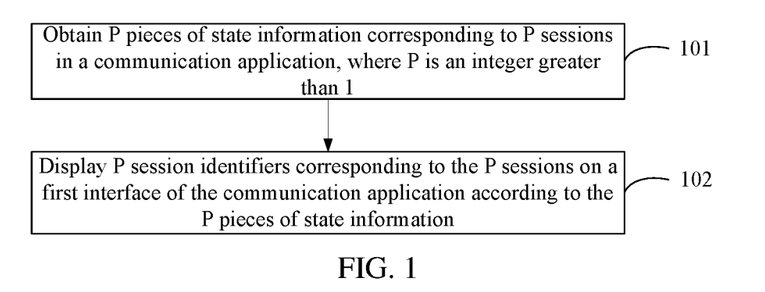
FIG. 1 is a first flowchart of a display method according to an embodiment of this application.

Referring to FIG. 1, FIG. 1 is a first flowchart of a display method according to an embodiment of this application. The display method in this embodiment of this application may be performed by an electronic device. As shown in FIG. 1, the display method may include the following steps:

Step 101: Obtain P pieces of state information corresponding to P sessions in a communication application, where P is an integer greater than 1.

In an implementation, in some embodiments, the electronic device may autonomously detect and obtain state information of a session. In some other embodiments, the electronic device may obtain state information of a session based on an instruction of a user, for example, the user may label the state information of the session. However, it should be noted that a manner in which the electronic device obtains the state information of the session is not limited in this embodiment of this application. This may be determined according to an actual requirement, and is not limited in this embodiment of this application.

The P sessions may be all or a part of sessions in the communication application, for example, the P sessions may be P sessions with a highest priority in the communication application. A priority of a session may be determined based on at least one of: importance of the session, processing frequency of the session, or the like. The P sessions may include at least one of: a session corresponding to a group, that is, a session whose quantity of contacts is greater than 2; or a session corresponding to an individual, that is, a session whose quantity of contacts is equal to 2.

In this embodiment of this application, the state information of the session is used to represent a state of a chat dialogue in the session, the state information of the session may include first state information and second state information, the first state information is used to represent that the chat dialogue in the session is in an incomplete state, and the second state information is used to represent that the chat dialogue in the session is in a completed state. For a session whose state information is the first state information, it indicates that chat of the session is completed, and there is no to-be-completed item (or referred to as a to-be-done item). For a session whose state information is the second state information, it indicates that the session is not completed, and there is a to-be-completed item.

Optionally, there are two cases in which the state information of the session may be the first state information.

In one case, the user of the electronic device (hereinafter referred to as our side or our party) forgets to reply to a message. In this case, to switch the state information of the session to the second state information, our side or our party need to reply to the message to complete a to-do list, that is, the to-do item may be performed by our side or our party.

In another case, a user (hereinafter referred to as the other side or the other party) of another electronic device forgets to reply to a message. In this case, to change the state information of the session to the second state information, the other side or the other party needs to reply to the message to complete a to-do list, that is, the to-do list may be performed by the other side or the other party.

Step 102: Display P session identifiers corresponding to the P sessions on a first interface of the communication application according to the P pieces of state information.

In this embodiment of this application, a session identifier corresponding to a session may be used to trigger to enter a chat interface of the session. In actual application, the user may interact with the session identifier corresponding to the session. For example, the user may trigger, by touching a session identifier corresponding to a session, the electronic device to enter a chat interface of the session, to process a message of the session.

A display manner of each session identifier is associated with state information of a session corresponding to the session identifier. Optionally, the electronic device may determine the display manner of the session identifier corresponding to the session based on the state information of the session, and may display the session identifier corresponding to the session in the determined display manner, so that sessions of different state information can be visually differentiated, that is, display manners of the sessions of different state information are different.

Optionally, a display manner of a session identifier may be determined, but not limited to, by at least one of: a display style of the session identifier, or a display area of the session identifier. Optionally, the display style of the session identifier may be determined by at least one of the following display parameters: a display color of the session identifier, a display shape of the session identifier, or a display mark related to the session identifier.

According to the display method in this embodiment, an electronic device may determine a display state of a session identifier corresponding to a session based on state information of the session. In this way, a user may directly identify the state information of the session based on the display state corresponding to the session identifier, that is, whether a chat dialogue in the session is in a completed state or in an incomplete state, so that a rate at which the user distinguishes sessions of different state information can be improved, thereby improving session processing efficiency of the user.

Optionally, the displaying P session identifiers corresponding to the P sessions on a first interface of the communication application according to the P pieces of state information may include at least one of:

displaying a session identifier corresponding to a first session on the first interface of the communication application in a first display manner; or displaying a session identifier corresponding to a second session on the first interface of the communication application in a second display manner, where the first session is a session whose state information is the first state information in the P sessions, and the second session is a session whose state information is the second state information in the P sessions.

In actual application, the first session may include a part or all of the P sessions, and the second session may include a part or all of the P sessions. That is, state information corresponding to each session in the P sessions may be the same or may be different.

In this optional implementation, display manners of session identifiers corresponding to the sessions of different state information are different. Optionally, the first display manner and the second display manner are different in at least one of: a display style, or a display area. Optionally, display styles of the first display manner and the second display manner may be different in at least one of the following display parameters: a display color of a session identifier, a display shape of the session identifier, a display mark related to the session identifier, or the like.

In an embodiment, the displaying P session identifiers corresponding to the P sessions on a first interface of the communication application according to the P pieces of state information may include at least one of:

displaying a session identifier corresponding to a first session on the first interface of the communication application in a first display style; or displaying a session identifier corresponding to a second session on the first interface of the communication application in a second display style.

In this embodiment, that display manners of session identifiers corresponding to the sessions of different state information are different may be: display styles of the session identifiers corresponding to the sessions of different state information are different, that is, the display styles may be distinguished for the session identifiers corresponding to the sessions of different state information. In this way, the user may distinguish state information of a session based on a display style of a session identifier corresponding to the session, to process an incomplete session.

In an implementation, the following implementations may be included but are not limited to:

In a first implementation, display colors of the first display style and the second display style may be different, that is, a display color of a session identifier corresponding to the session of the first state information and to display color of a session identifier corresponding to the session of the second state information may be different.

In a second implementation, display shapes of the first display style and the second display style may be different, that is, a display shape of a session identifier corresponding to the session of the first state information and a display shape of a session identifier corresponding to the session of the second state information may be different.

In a third implementation, display marks related to session identifiers of the first display style and the second display style are different. Optionally, in one case, a mark may be displayed before a session identifier corresponding to the session of the first state information (or the second state information), and no mark is displayed before a session identifier corresponding to the session of the second state information (or the first state information). In another case, marks may be displayed before the session identifiers corresponding to the sessions of the two types of state information, but the displayed marks are different.

For ease of understanding, with reference to FIG. 2A to FIG. 2D, an example is illustrated as follows:

It is assumed that state information of a session 1 and a session 2 is the first state information, and state information of a session 3 to a session 5 is the second state information. Session identifiers successively corresponding to the session 1 to the session 5 are respectively a session identifier 1 to a session identifier 5.

Figure 2A:
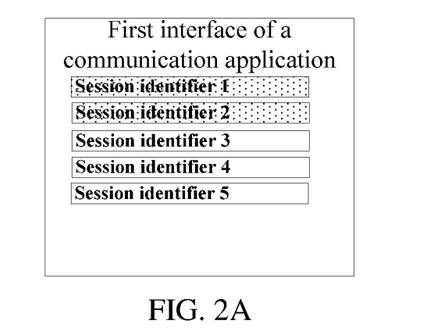
FIG. 2A is a first schematic diagram of a first interface of a communication application according to an embodiment of this application.

Therefore, in the foregoing first implementation, as shown in FIG. 2A, session identifiers on the first interface of the communication application may include two display colors, where one display color corresponds to the session identifier 1 and the session identifier 2, and the other display color corresponds to the session identifier 3 to the session identifier 5.

Figure 2B:
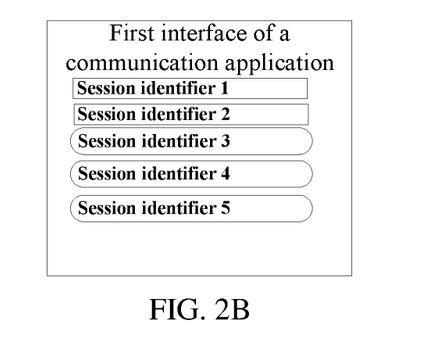
FIG. 2B is a second schematic diagram of a first interface of a communication application according to an embodiment of this application.

In the foregoing second implementation, as shown in FIG. 2B, display shapes of the session identifier 1 and the session identifier 2 are the same, and are rectangles with square corners, and display shapes of the session identifier 3 to the session identifier 5 are the same, and are rectangles with rounded corners.

Figure 2C:
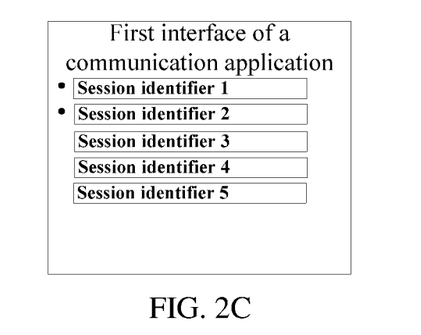
FIG. 2C is a third schematic diagram of a first interface of a communication application according to an embodiment of this application.

In a first case of the foregoing third implementation, as shown in FIG. 2C, one dot is displayed before each of the session identifier 1 and the session identifier 2, and no dot is displayed before the session identifier 3 to the session identifier 5.

Figure 2D:
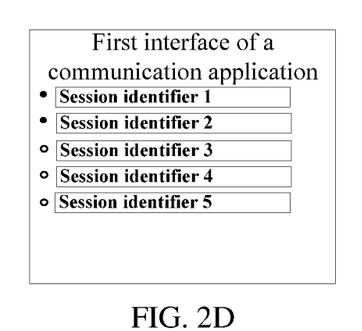
FIG. 2D is a fourth schematic diagram of a first interface of a communication application according to an embodiment of this application.

In a second case of the foregoing third implementation, as shown in FIG. 2D, a solid dot is displayed before each of the session identifier 1 and the session identifier 2, and a hollow dot is displayed before each of the session identifier 3 to the session identifier 5.

It should be noted that display colors, display shapes, and display marks of the session identifiers in FIG. 2A to FIG. 2D are all examples. Therefore, an expression form of a display color, a display shape, and a display mark of a session identifier is not limited. This may be set according to an actual requirement, and is not limited in this embodiment of this application.

In view of the above, in the foregoing optional implementations, at least one of display parameters of the session identifiers corresponding to the sessions of different state information is different. Therefore, the user may quickly distinguish the sessions of different state information, and quickly identify and process an incomplete session, thereby improving processing efficiency of the incomplete session.

In another embodiment, the displaying P session identifiers corresponding to the P sessions on a first interface of the communication application according to the P pieces of state information may include at least one of:

displaying a session identifier corresponding to a first session in a first display area on the first interface of the communication application; or displaying a session identifier corresponding to a second session in a second display area on the first interface of the communication application.

In this embodiment, that display manners of session identifiers corresponding to the sessions of different state information are different may be: display areas of the session identifiers corresponding to the sessions of different state information are different, that is, the display areas may be distinguished for the session identifiers corresponding to the sessions of different state information. In this way, the user may distinguish state information of a session based on a display area of a session identifier corresponding to the session, to process an incomplete session.

In an implementation, the first display area and the second display area may be set by the user.

The first display area may display a word "incomplete" or an object such as a character or a graph corresponding to the first state information, and the second display area may display a word "complete" or an object such as a character or a graph corresponding to the second state information. The first display area and the second display area may be continuous or discontinuous. The first display area may be located before the second display area. For example, the electronic device may display a session identifier corresponding to an incomplete session at the top of the terminal interface.

In this way, the user may quickly distinguish the sessions of different state information by using display areas, thereby improving session processing efficiency.

It should be noted that, in actual application, the foregoing two embodiments may be implemented independently or in combination. This may be determined according to an actual situation, and is not limited in this embodiment of this application.

In a case that the foregoing two embodiments are implemented in combination, the electronic device may distinguish display styles and display areas of the session identifiers corresponding to the sessions of different state information In this way, the user may distinguish the sessions of different state information by using display areas and display styles, thereby improving differentiation of the sessions of different state information, and improving processing efficiency of an incomplete session.

It can be learned from the foregoing content that a to-do list of the session of the first state information may be performed by our side or our party or the other side or the other party. In the foregoing two cases, to change the state information of the session to the second state information, the electronic device performs different actions. For example, in the former case, our party may change the state information of the session to the second state information by replying a message. In the latter case, our party may change the state information of the session to the second state information by prompting the other party to reply to a message. Therefore, to improve processing efficiency of an incomplete session, the electronic device may perform a corresponding operation, to help the user of the electronic device quickly distinguish two different cases, thereby improving processing efficiency of an incomplete session.

Optionally, the displaying P session identifiers corresponding to the P sessions on a first interface of the communication application according to the P pieces of state information includes:

determining Q first sessions in the P sessions according to the P pieces of state information, where state information of the first session is the first state information, and Q is an integer less than or equal to P;

determining Q target objects corresponding to the Q first sessions, where the target object is an object that needs to reply to a message in the first session; and displaying Q session identifiers corresponding to the Q first sessions on the first interface of the communication application according to the Q target objects.

In this optional implementation, after selecting the first session in the P sessions through screening, the electronic device may determine whether a target object that needs to reply to a message in each first session is our part or the other party, and may determine a display manner of a session identifier corresponding to each first session based on the target object corresponding to each first session, that is, the display manner of the session identifier corresponding to each first session is associated with the target object corresponding to each first session. In this way, the user may learn the target object corresponding to each first session based on the display manner corresponding to each first session, and may perform different operations for sessions of different target objects, thereby improving processing efficiency of an incomplete session.

Optionally, the first session includes at least one of a first sub-session or a second sub-session, where a target object corresponding to the first sub-session is a login object of the communication application, that is, the target object is our party, and a target object corresponding to the second sub-session is not a login object of the communication application, that is, the target object is the other party.

The displaying Q session identifiers corresponding to the Q first sessions on the first interface of the communication application according to the Q target objects includes at least one of:

displaying a session identifier corresponding to the first sub-session on the first interface of the communication application in a third display manner; or displaying a session identifier corresponding to the second sub-session on the first interface of the communication application in a fourth display manner.

In this optional implementation, session identifiers of a first-type session whose target object is our party and a second-type session whose target object is the other party are visually differentiated, so that the user can perform different operations for sessions of different target objects, thereby improving processing efficiency of an incomplete session.

Optionally, the third display manner and the fourth display manner are different in at least one of: a display style, or a display area. Optionally, display styles of the third display manner and the fourth display manner may be different in at least one of the following display parameters: a display color of a session identifier, a display shape of the session identifier, a display mark related to the session identifier, or the like.

It should be noted that an implementation principle of the "displaying Q session identifiers corresponding to the Q first sessions on the first interface of the communication application according to the Q target objects" is similar to an implementation principle of the "displaying P session identifiers corresponding to the P sessions on a first interface of the communication application according to the P pieces of state information". Refer to the foregoing descriptions about the "displaying P session identifiers corresponding to the P sessions on a first interface of the communication application according to the P pieces of state information". Details are not described herein again.

For ease of understanding, with reference to FIG. 3, an example is illustrated as follows:

It is assumed that state information of a session 1 and a session 2 is the first state information, and state information of a session 3 to a session 5 is the second state information: a completed state, where a reason that the session 1 is not completed is that our party does not reply to a message, and a reason that the session 2 is not completed is that the other party does not reply to a message. Session identifiers successively corresponding to the session 1 to the session 5 are respectively a session identifier 1 to a session identifier 5.

Figure 3:
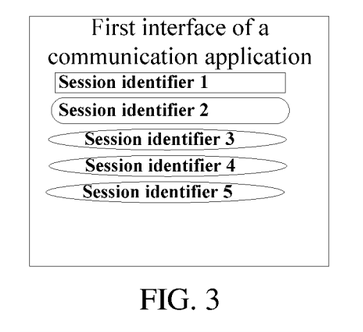
FIG. 3 is a fifth schematic diagram of a first interface of a communication application according to an embodiment of this application.

Therefore, as shown in FIG. 3, display shapes of the session identifier 1 and the session identifier 2 may be rectangles, but a display shape of the session identifier 1 is a rectangle with square corners, and a display shape of the session identifier 2 is a rectangle with rounded corners; and display shapes of the session identifier 3 to the session identifier 5 are ellipses.

In this way, the user may quickly distinguish the sessions of different state information. Optionally, which side causes an incomplete session may be quickly distinguished. In this way, the user may perform corresponding operations based on the sessions of different state information. For example, if an incomplete session is caused by our party, our party may reply to a message to change the state information of the session to a completed state. If an incomplete session is caused by the other party, a message may be sent to prompt the other party to reply to a message to change the state information of the session to a completed state, thereby improving session processing efficiency.

Optionally, the determining Q target objects corresponding to the Q first sessions includes:
  obtaining end information of the first session; and
  determining a target object corresponding to the first session according to a sending object of the end information.

It can be understood that the end information may reflect the last piece of information, and a receiving time of the end information is not limited.

In this embodiment of this application, the end information of the first session may be understood as a last message of the first session. A receiving time or a sending time of the end information may be before a first time, or may be after the first time. The first time is a time at which a chat interface of the first session exits the foreground, that is, the end information may be received or sent when the first session is running in the foreground, or may be received or sent when the first session is running in the background.

In an implementation, in a case that the sending object of the end information is a login object of the communication application, it is determined that the target object corresponding to the first session is a login object of the communication application; and in a case that the sending object of the end information is not a login object of the communication application, it is determined that the target object corresponding to the first session is not a login object of the communication application.

In this optional implementation, the electronic device may determine a target object corresponding to each session based on a sending object of the end information of each first session. Certainly, it can be understood that, in another implementation, the target object corresponding to each session may be determined in another manner. For example, the user may label a target object corresponding to a session.

In this embodiment of this application, optionally, the P sessions include a first session, and state information of the first session is the first state information; and
  the displaying P session identifiers corresponding to the P sessions on a first interface of the communication application according to the P pieces of state information includes:
  displaying a first session identifier on the first interface of the communication application according to the state information of the first session, and displaying target information at a first location of the first interface, where
  the first location corresponds to a display location of the first session identifier, and the first session identifier is a session identifier corresponding to the first session; and
  the target information includes at least one of:
  first information or a first control, where the first information is determined based on an incomplete item of the first session, and the first control is used to trigger display of the first information; or
  a second control, where in a case that a target object corresponding to the first session is a login object of the communication application, the second control is a reply control; and in a case that the target object corresponding to the first session is not a login object of the communication application, the second control is a reminder control, and the target object is an object that needs to reply to a message in the first session.

In this optional implementation, for implementation of the "displaying a first session identifier on the first interface of the communication application according to the state information of the first session", refer to the foregoing descriptions. Details are not described herein again. The following mainly describes the "displaying target information at a first location of the first interface".

In an implementation, setting of first locations corresponding to display locations of different session identifiers may meet: The user may distinguish that a target object displayed in the first location serves a session corresponding to the session identifier. Optionally, the first location may be a display location of the session identifier, or may be a surrounding location of the display location of the session identifier.

Figure 4A:
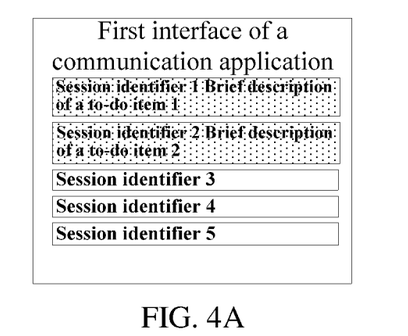
FIG. 4A is a sixth schematic diagram of a first interface of a communication application according to an embodiment of this application.

The first information may be a brief description of an incomplete item, or may be a session screenshot. The screenshot includes the last K pieces of information of the session, and K is a positive integer. In some embodiments, as shown in FIG. 4A, the electronic device may display, at a display location of a session identifier, a brief description of an incomplete item of a session corresponding to the session identifier. When a display length of the first information is greater than a length of the display location of the session identifier, the first information may be scrolled and displayed at the display location of the session identifier.

Figure 4B:
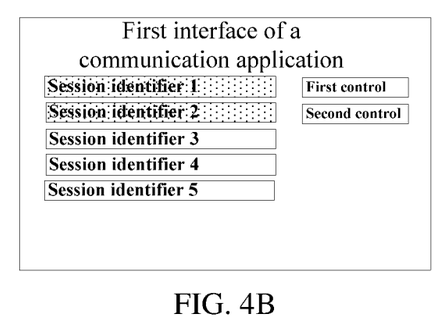
FIG. 4B is a seventh schematic diagram of a first interface of a communication application according to an embodiment of this application.

The first control may be used to trigger display of the first information. In actual application, the user may trigger, by touching the first control, the electronic device to display the first information. Optionally, as shown in FIG. 4B, the electronic device may display the first control on the right side of the display location of the session identifier. If the user touches the first control, as shown in FIG. 4A, the electronic device may display a brief description of an incomplete item of a session corresponding to the session identifier at the display location of the session identifier.

It can be learned that the first information or the first control is displayed at the first location, so that the user can quickly focus on a to-be-completed item, thereby improving session processing efficiency.

The second control may be an input box, or the second control may be used to trigger display of the input box, that is, the user may trigger, by touching the second control, the electronic device to display the input box.

It can be learned that the second control is displayed at the first location, to help the user quickly enter a message. The user may chat with another user by using the second control, reply to the other party or prompt the other party to reply to a message, and then change the state information to the second state information, without triggering the electronic device to enter the chat interface of the session, thereby improving session processing efficiency.

It can be learned from the foregoing content that the electronic device may independently detect the state information of the session. Optionally, the electronic device may detect the state information of the session in the following manner:

Optionally, the obtaining P pieces of state information of P sessions in a communication application includes:
  obtaining end information of an i-th session in the communication application, where a value range of i is from 1 to P, and i is an integer;
  matching the end information with N pieces of pre-obtained storage information to obtain a matching result, where the N pieces of storage information are used to identify that state information is the first state information, and N is a positive integer; and
  determining state information of the i-th session according to the matching result.

The N pieces of storage information includes at least one of: a keyword used to identify that state information is an incomplete state, or a statement used to identify that state information is an incomplete state. For example, the N pieces of storage information may include at least one of: "Please"; "?"; "Isn't it"; "Right?"; "Yes or No?"; or "When?". In actual application, the N pieces of storage information may be stored in a database of the electronic device, and the storage information in the database may be updated. For example, the user adds, edits, and expands the storage information, thereby implementing continuous improvement of the database and improving detection accuracy of state information.

In an implementation, in a case that the matching result is that there is storage information matching the end information in the N pieces of storage information, the state information of the i-th session may be determined as the first state information; and in a case that the matching result is that there is no storage information matching the end information in the N pieces of storage information, the state information of the i-th session may be determined as the second state information.

If the second information includes any one of the N pieces of storage information, it may be considered that the matching result is that there is storage information matching the end information in the N pieces of storage information. Otherwise, it may be considered that the matching result is that there is no storage information matching the end information in the N storage information.

For ease of understanding, with reference to FIG. 5A to FIG. 5C, an example is illustrated as follows:

It is assumed that the N pieces of storage information may include at least one of: "Please"; "?"; "Isn't it"; "Right?"; "Yes or No?"; or "When?".

Figure 5A:
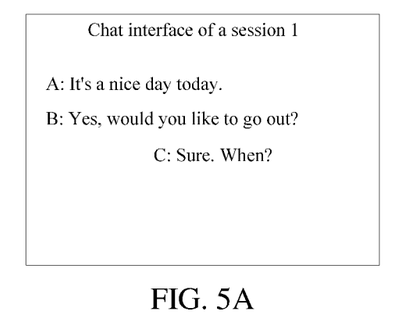
FIG. 5A is a first schematic diagram of a chat interface according to an embodiment of this application.

In FIG. 5A, end information of a chat interface of a session 1 is "Sure. When?" sent by C. Because the end information includes the storage information "When", the electronic device may determine that state information of the session 1 is the first state information.

Figure 5B:
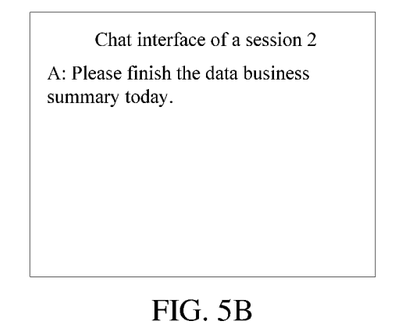
FIG. 5B is a second schematic diagram of a chat interface according to an embodiment of this application.

In FIG. 5B, end information of a chat interface of a session 2 is "Please finish the data business summary today" sent by A. Because the end information includes the storage information "Please", the electronic device may determine that state information of the session 2 is the first state information.

Figure 5C:
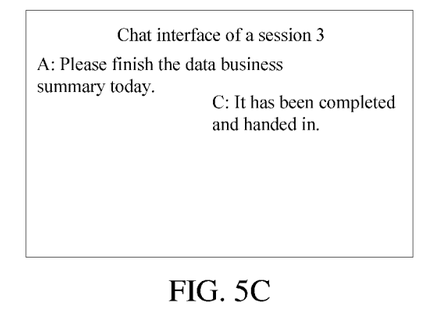
FIG. 5C is a third schematic diagram of a chat interface according to an embodiment of this application.

In FIG. 5C, end information of a chat interface of a session 3 is "It has been completed and handed in" sent by C. Because the end information includes no storage information, the electronic device may determine that state information of the session 3 is the second state information.

In the foregoing manner, the electronic device may identify the state information of the session by comparing the last message of the session with the N pieces of prestored storage information, thereby improving autonomy of identifying state information.

It should be noted that the plurality of optional implementations described in this embodiment of this application may be implemented in combination with each other without conflict, or may be separately implemented. This is not limited in this embodiment of this application.

Figure 6:
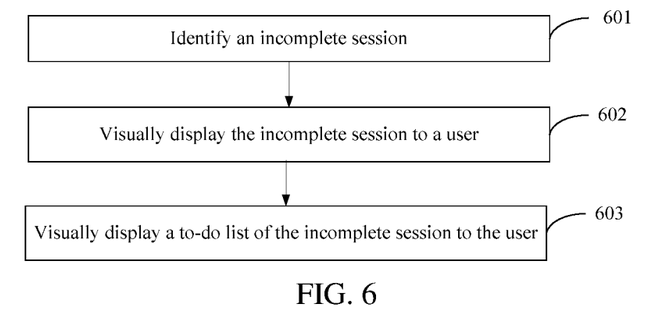
FIG. 6 is a second flowchart of a display method according to an embodiment of this application.

For ease of understanding, with reference to FIG. 6, an example is illustrated as follows:

As shown in FIG. 6, the display method may include the following steps:

Step 601: Identify an incomplete session.

Step 602: Visually display the incomplete session to a user.

Step 603: Visually display a to-do list of the incomplete session to the user.

It can be learned that, in this embodiment of this application, the user can clearly learn: (1) Which chat states are not completed; (2) Visually highlight incomplete state information by using colors or through pinning; and (3) Show incomplete chat content to the user in a brief description manner, so that the user can quickly obtain an incomplete chat group and a chat summary.

It should be noted that the display method provided in the embodiments of this application may be performed by a display apparatus, or a control module that is in the display apparatus and that is configured to perform the display method. In the embodiments of this application, an example in which the display apparatus performs the display method is used to describe the display apparatus provided in the embodiments of this application.

Figure 7:
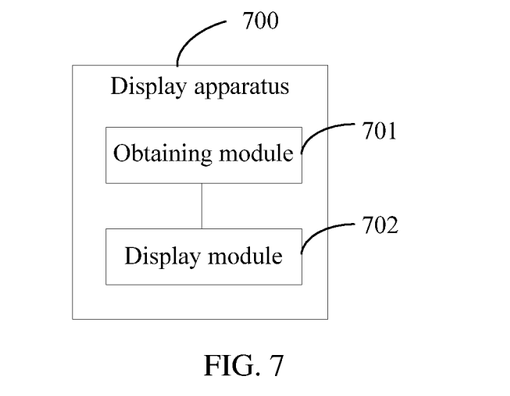
FIG. 7 is a structural diagram of a display apparatus according to an embodiment of this application.

Referring to FIG. 7, FIG. 7 is a structural diagram of a display apparatus according to an embodiment of this application.

As shown in FIG. 7, the display apparatus 700 includes:
  an obtaining module 701, configured to obtain P pieces of state information corresponding to P sessions in a communication application, where P is an integer greater than 1; and
  a display module 702, configured to display P session identifiers corresponding to the P sessions on a first interface of the communication application according to the P pieces of state information, where
  a display manner of each session identifier is associated with state information of a session corresponding to the session identifier; and the state information of the session is used to represent a state of a chat dialogue in the session, the state information of the session includes first state information and second state information, the first state information is used to represent that the chat dialogue in the session is in an incomplete state, and the second state information is used to represent that the chat dialogue in the session is in a completed state.

Optionally, the obtaining module includes:

an obtaining submodule, configured to obtain end information of an i-th session in the communication application, where a value range of i is from 1 to P, and i is an integer;

a matching submodule, configured to match the end information with N pieces of pre-obtained storage information to obtain a matching result, where the N pieces of storage information are used to identify that state information is the first state information, and N is a positive integer; and a first determining submodule, configured to determine state information of the i-th session according to the matching result, where the N pieces of storage information includes at least one of: a keyword used to identify that state information is an incomplete state, or a statement used to identify that state information is an incomplete state.

Optionally, in a case that the matching result is that there is storage information matching the end information in the N pieces of storage information, the state information of the i-th session is determined as the first state information; and in a case that the matching result is that there is no storage information matching the end information in the N pieces of storage information, the state information of the i-th session is determined as the second state information.

Optionally, the display module 702 includes at least one of:

a first display submodule, configured to display a session identifier corresponding to a first session on the first interface of the communication application in a first display manner; or a second display submodule, configured to display a session identifier corresponding to a second session on the first interface of the communication application in a second display manner, where the first session is a session whose state information is the first state information in the P sessions, and the second session is a session whose state information is the second state information in the P sessions.

Optionally, the display module 702 includes:

a second determining submodule, configured to determine Q first sessions in the P sessions according to the P pieces of state information, where state information of the first session is the first state information, and Q is an integer less than or equal to P;

a third determining submodule, configured to determine Q target objects corresponding to the Q first sessions, where the target object is an object that needs to reply to a message in the first session; and a third display submodule, configured to display Q session identifiers corresponding to the Q first sessions on the first interface of the communication application according to the Q target objects.

Optionally, the first session includes at least one of a first sub-session or a second sub-session, a target object corresponding to the first sub-session is a login object of the communication application, and a target object corresponding to the second sub-session is not a login object of the communication application; and the third display submodule includes at least one of:

a first display unit, configured to display a session identifier corresponding to the first sub-session on the first interface of the communication application in a third display manner; or a second display unit, configured to display a session identifier corresponding to the second sub-session on the first interface of the communication application in a fourth display manner.

Optionally, the third determining submodule includes:

an obtaining unit, configured to obtain end information of the first session; and a determining unit, configured to determine a target object corresponding to the first session according to a sending object of the end information.

Optionally, the end information is a last message of the first session, and a receiving time or a sending time of the end information is before a first time, or the receiving time or the sending time of the end information is after the first time, and the first time is a time at which a chat interface of the first session exits the foreground.

Optionally, the P sessions include a first session, and state information of the first session is the first state information; and the display module 702 is configured to:

display a first session identifier on the first interface of the communication application according to the state information of the first session, and display target information at a first location of the first interface, where the first location corresponds to a display location of the first session identifier, and the first session identifier is a session identifier corresponding to the first session; and the target information includes at least one of:

first information or a first control, where the first information is determined based on an incomplete item of the first session, and the first control is used to trigger display of the first information; or a second control, where in a case that a target object corresponding to the first session is a login object of the communication application, the second control is a reply control; and in a case that the target object corresponding to the first session is not a login object of the communication application, the second control is a reminder control, and the target object is an object that needs to reply to a message in the first session.

The display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not limited in the embodiments of this application.

The display apparatus in this embodiment of this application may be an apparatus with an operating system. The operating system may be an Android operating system, an iOS operating system, or another possible operating system. This is not limited in this embodiment of this application.

The display apparatus provided in this embodiment of this application can implement the processes implemented by the display apparatus in the method embodiment in FIG. 1. To avoid repetition, details are not described herein again.

Figure 8:
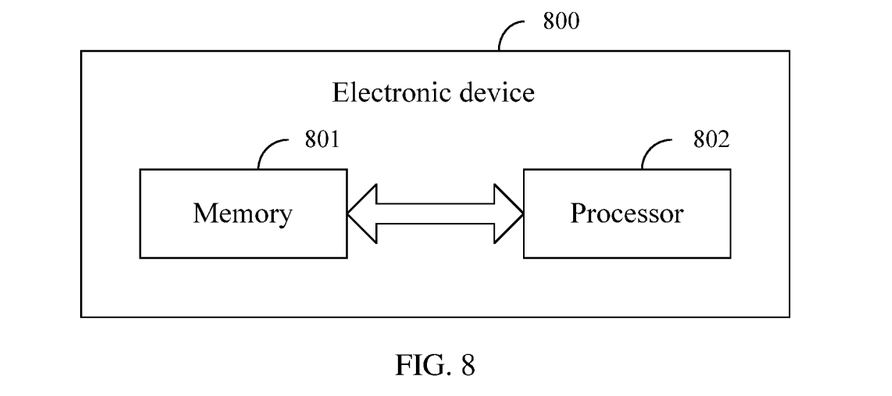
FIG. 8 is a first structural diagram of an electronic device according to an embodiment of this application.

Optionally, as shown in FIG. 8, an embodiment of this application further provides an electronic device 800, including a processor 802, a memory 801, and a program or an instruction stored in the memory 801 and executable on the processor 802. When the program or the instruction is executed by the processor 802, the processes of the foregoing display method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 9:
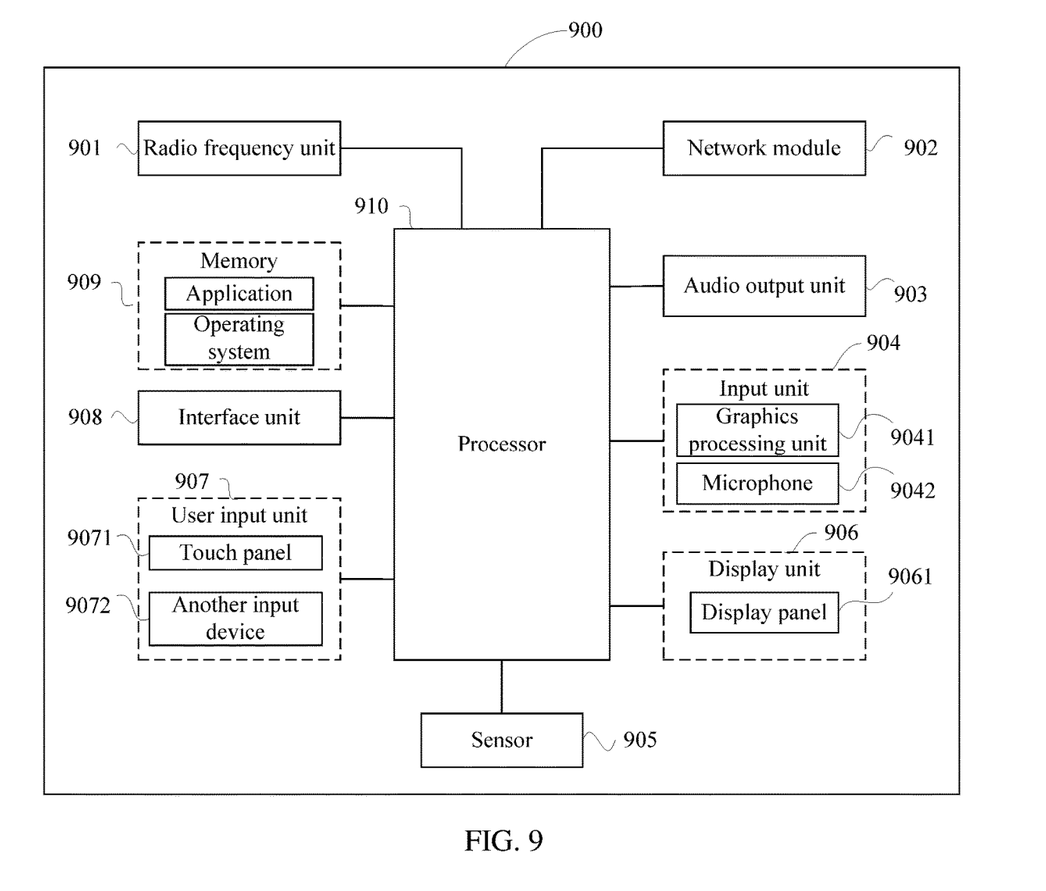
FIG. 9 is a second structural diagram of an electronic device according to an embodiment of this application.

FIG. 9 is a schematic structural diagram of hardware of an electronic device according to an embodiment of this application.

An electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 9010.

A person skilled in the art can understand that the electronic device 900 may further include a power supply (such as a battery) that supplies power to each component. The power supply may be logically connected to the processor 9010 by using a power supply management system, to implement functions such as charging and discharging management, and power consumption management by using the power supply management system. The structure of the electronic device shown in FIG. 9 does not constitute a limitation on the electronic device. The electronic device may include components more or fewer than those shown in the diagram, a combination of some components, or different component arrangements. Details are not described herein.

The processor 9010 is configured to:
obtain P pieces of state information corresponding to P sessions in a communication application, where P is an integer greater than 1; and
display P session identifiers corresponding to the P sessions on a first interface of the communication application by using the display unit 906 according to the P pieces of state information, where
a display manner of each session identifier is associated with state information of a session corresponding to the session identifier; and the state information of the session is used to represent a state of a chat dialogue in the session, the state information of the session includes first state information and second state information, the first state information is used to represent that the chat dialogue in the session is in an incomplete state, and the second state information is used to represent that the chat dialogue in the session is in a completed state.

Optionally, the processor 9010 is configured to perform at least one of:
display a session identifier corresponding to a first session on the first interface of the communication application in a first display manner by using the display unit 906; or
display a session identifier corresponding to a second session on the first interface of the communication application in a second display manner by using the display unit 906, where
the first session is a session whose state information is the first state information in the P sessions, and the second session is a session whose state information is the second state information in the P sessions.

Optionally, the processor 9010 is configured to:
determine Q first sessions in the P sessions according to the P pieces of state information, where state information of the first session is the first state information, and Q is an integer less than or equal to P;
determine Q target objects corresponding to the Q first sessions, where the target object is an object that needs to reply to a message in the first session; and
display Q session identifiers corresponding to the Q first sessions on the first interface of the communication application by using the display unit 906 according to the Q target objects.

Optionally, the first session includes at least one of a first sub-session or a second sub-session, a target object corresponding to the first sub-session is a login object of the communication application, and a target object corresponding to the second sub-session is not a login object of the communication application; and
the processor 9010 is configured to perform at least one of:
displaying a session identifier corresponding to the first sub-session on the first interface of the communication application in a third display manner by using the display unit 906; or
displaying a session identifier corresponding to the second sub-session on the first interface of the communication application in a fourth display manner by using the display unit 906.

Optionally, the processor 9010 is configured to:
obtain end information of the first session; and
determine a target object corresponding to the first session according to a sending object of the end information.

Optionally, the P sessions include a first session, and state information of the first session is the first state information; and
the processor 9010 is configured to:
display a first session identifier on the first interface of the communication application according to the state information of the first session, and display target information at a first location of the first interface by using the display unit 906, where
the first location corresponds to a display location of the first session identifier, and the first session identifier is a session identifier corresponding to the first session; and
the target information includes at least one of:
first information or a first control, where the first information is determined based on an incomplete item of the first session, and the first control is used to trigger display of the first information; or
a second control, where in a case that a target object corresponding to the first session is a login object of the communication application, the second control is a reply control; and in a case that the target object corresponding to the first session is not a login object of the communication application, the second control is a reminder control, and the target object is an object that needs to reply to a message in the first session.

It should be understood that, in this embodiment of this application, the input unit 904 may include a graphics processing unit (GPU) 9041 and a microphone 9042, and the graphics processing unit 9041 processes image data of a still picture or a video obtained by an image capture apparatus (such as a camera) in a video capture mode or an image capture mode. The display unit 906 may include a display panel 9061. Optionally, the display panel 9061 may be configured in a form such as a liquid crystal display or an organic light-emitting diode. The user input unit 907 includes a touch panel 9071 and another input device 9072. The touch panel 9071 is also referred to as a touchscreen. The touch panel 9071 may include two parts: a touch detection apparatus and a touch controller. The another input device 9072 may include but is not limited to a physical keyboard, a functional button (such as a volume control button or a power on/off button), a trackball, a mouse, and a joystick. Details are not described herein. The memory 909 may be configured to store a software program and various data, including but not limited to an application and an operating system. An application processor and a modem processor may be integrated into the processor 9010, the application processor mainly processes an operating system, a user interface, an application, and the like, and the modem processor mainly processes wireless communication. It can be understood that, alternatively, the modem processor may not be integrated into the processor 9010.

An embodiment of this application further provides a non-transitory readable storage medium. The non-transitory readable storage medium stores a program or an instruction, and when the program or the instruction is executed by a processor, the processes of the foregoing display method embodiment are implemented, and a same technical effect can be achieved. To avoid repetition, details are not described herein again.

The processor is a processor in the electronic device in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing display method embodiment, and a same technical effect can be achieved. To avoid repetition, details are not described again.

It should be understood that the chip mentioned in this embodiment of this application may also be referred to as a system-level chip, a system chip, a chip system, or an on-chip system chip.

An embodiment of this application further provides a computer program product. The computer program product is stored in a non-transitory readable storage medium, and the computer program product is executed by at least one processor to implement the processes of the foregoing display method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A display method, comprising:
    obtaining P pieces of state information corresponding to P sessions in a communication application, wherein P is an integer greater than 1; and
    displaying P session identifiers corresponding to the P sessions on a first interface of the communication application according to the P pieces of state information, wherein
    a display manner of each session identifier is associated with state information of a session corresponding to the session identifier; and the state information of the session is used to represent a state of a chat dialogue in the session, the state information of the session comprises first state information and second state information, the first state information is used to represent that the chat dialogue in the session is in an incomplete state, and the second state information is used to represent that the chat dialogue in the session is in a completed state; wherein
    the displaying P session identifiers corresponding to the P sessions on a first interface of the communication application according to the P pieces of state information comprises:
    determining Q first sessions in the P sessions according to the P pieces of state information, wherein state information of a first session is the first state information, and Q is an integer less than or equal to P;
    determining Q target objects corresponding to the Q first sessions, wherein a target object is an object that needs to reply to a message in the first session; and
    displaying Q session identifiers corresponding to the Q first sessions on the first interface of the communication application according to the Q target objects.

2. The method according to claim 1, wherein the obtaining P pieces of state information corresponding to P sessions in a communication application comprises:

obtaining end information of an i-th session in the communication application, wherein a value range of i is from 1 to P, and i is an integer;

matching the end information with N pieces of pre-obtained storage information to obtain a matching result, wherein the N pieces of storage information are used to identify that state information is the first state information, and N is a positive integer; and determining state information of the i-th session according to the matching result, wherein the N pieces of storage information comprises at least one of: a keyword used to identify that state information is an incomplete state, or a statement used to identify that state information is an incomplete state.

3. The method according to claim 2, wherein in a case that the matching result is that there is storage information matching the end information in the N pieces of storage information, the state information of the i-th session is determined as the first state information; and in a case that the matching result is that there is no storage information matching the end information in the N pieces of storage information, the state information of the i-th session is determined as the second state information.

4. The method according to claim 1, wherein the displaying Q session identifiers corresponding to the Q first sessions on the first interface of the communication application according to the Q target objects comprises:

displaying the Q session identifiers corresponding to the Q first sessions on the first interface of the communication application in a first display manner; and the method further comprises:

displaying a session identifier corresponding to a second session on the first interface of the communication application in a second display manner, wherein the second session is a session whose state information is the second state information in the P sessions.

5. The method according to claim 1, wherein the first session comprises at least one of a first sub-session or a second sub-session, a target object corresponding to the first sub-session is a login object of the communication application, and a target object corresponding to the second sub-session is not a login object of the communication application; and the displaying Q session identifiers corresponding to the Q first sessions on the first interface of the communication application according to the Q target objects comprises at least one of:

displaying a session identifier corresponding to the first sub-session on the first interface of the communication application in a third display manner; or displaying a session identifier corresponding to the second sub-session on the first interface of the communication application in a fourth display manner.

6. The method according to claim 1, wherein the determining Q target objects corresponding to the Q first sessions comprises:

obtaining end information of the first session; and determining a target object corresponding to the first session according to a sending object of the end information.

7. The method according to claim 6, wherein the end information is a last message of the first session, and a receiving time or a sending time of the end information is before a first time, or the receiving time or the sending time of the end information is after the first time, and the first time is a time at which a chat interface of the first session exits a foreground.

8. The method according to claim 1, wherein the displaying P session identifiers corresponding to the P sessions on a first interface of the communication application according to the P pieces of state information further comprises:

displaying a first session identifier on the first interface of the communication application according to the state information of the first session, and displaying target information at a first location of the first interface, wherein the first location corresponds to a display location of the first session identifier, and the first session identifier is a session identifier corresponding to the first session; and the target information comprises at least one of:

first information or a first control, wherein the first information is determined based on an incomplete item of the first session, and the first control is used to trigger display of the first information; or a second control, wherein in a case that a target object corresponding to the first session is a login object of the communication application, the second control is a reply control; and in a case that the target object corresponding to the first session is not a login object of the communication application, the second control is a reminder control, and the target object is an object that needs to reply to a message in the first session.

9. An electronic device, comprising a processor, a memory, and a program or an instruction stored in the memory and executable on the processor, wherein the program or the instruction, when executed by the processor, causes the electronic device to perform:

obtaining P pieces of state information corresponding to P sessions in a communication application, wherein P is an integer greater than 1; and displaying P session identifiers corresponding to the P sessions on a first interface of the communication application according to the P pieces of state information, wherein a display manner of each session identifier is associated with state information of a session corresponding to the session identifier; and the state information of the session is used to represent a state of a chat dialogue in the session, the state information of the session comprises first state information and second state information, the first state information is used to represent that the chat dialogue in the session is in an incomplete state, and the second state information is used to represent that the chat dialogue in the session is in a completed state; wherein the program or the instruction, when executed by the processor, causes the electronic device to perform:

determining Q first sessions in the P sessions according to the P pieces of state information, wherein state information of a first session is the first state information, and Q is an integer less than or equal to P;

determining Q target objects corresponding to the Q first sessions, wherein a target object is an object that needs to reply to a message in the first session; and displaying Q session identifiers corresponding to the Q first sessions on the first interface of the communication application according to the Q target objects.

10. The electronic device according to claim 9, wherein the program or the instruction, when executed by the processor, causes the electronic device to perform:
- obtaining end information of an i-th session in the communication application, wherein a value range of i is from 1 to P, and i is an integer;
- matching the end information with N pieces of pre-obtained storage information to obtain a matching result, wherein the N pieces of storage information are used to identify that state information is the first state information, and N is a positive integer; and
- determining state information of the i-th session according to the matching result, wherein
- the N pieces of storage information comprises at least one of: a keyword used to identify that state information is an incomplete state, or a statement used to identify that state information is an incomplete state.

11. The electronic device according to claim 10, wherein in a case that the matching result is that there is storage information matching the end information in the N pieces of storage information, the state information of the i-th session is determined as the first state information; and in a case that the matching result is that there is no storage information matching the end information in the N pieces of storage information, the state information of the i-th session is determined as the second state information.

12. The electronic device according to claim 9, wherein the program or the instruction, when executed by the processor, causes the electronic device to perform:
- displaying the Q session identifiers corresponding to the Q first sessions on the first interface of the communication application in a first display manner; and
- displaying a session identifier corresponding to a second session on the first interface of the communication application in a second display manner, wherein
- the second session is a session whose state information is the second state information in the P sessions.

13. The electronic device according to claim 9, wherein the first session comprises at least one of a first sub-session or a second sub-session, a target object corresponding to the first sub-session is a login object of the communication application, and a target object corresponding to the second sub-session is not a login object of the communication application; and
the program or the instruction, when executed by the processor, causes the electronic device to perform at least one of:
- displaying a session identifier corresponding to the first sub-session on the first interface of the communication application in a third display manner; or
- displaying a session identifier corresponding to the second sub-session on the first interface of the communication application in a fourth display manner.

14. The electronic device according to claim 9, wherein the program or the instruction, when executed by the processor, causes the electronic device to perform:
- obtaining end information of the first session; and
- determining a target object corresponding to the first session according to a sending object of the end information.

15. The electronic device according to claim 14, wherein the end information is a last message of the first session, and a receiving time or a sending time of the end information is before a first time, or the receiving time or the sending time of the end information is after the first time, and the first time is a time at which a chat interface of the first session exits a foreground.

16. The electronic device according to claim 9, wherein the program or the instruction, when executed by the processor, causes the electronic device to further perform:
- displaying a first session identifier on the first interface of the communication application according to the state information of the first session, and displaying target information at a first location of the first interface, wherein
- the first location corresponds to a display location of the first session identifier, and the first session identifier is a session identifier corresponding to the first session; and
- the target information comprises at least one of:
- first information or a first control, wherein the first information is determined based on an incomplete item of the first session, and the first control is used to trigger display of the first information; or
- a second control, wherein in a case that a target object corresponding to the first session is a login object of the communication application, the second control is a reply control; and in a case that the target object corresponding to the first session is not a login object of the communication application, the second control is a reminder control, and the target object is an object that needs to reply to a message in the first session.

17. A non-transitory readable storage medium, wherein a program or an instruction is stored in the non-transitory readable storage medium, and the program or the instruction, when executed by a processor of an electronic device, causes the electronic device to perform:
- obtaining P pieces of state information corresponding to P sessions in a communication application, wherein P is an integer greater than 1; and
- displaying P session identifiers corresponding to the P sessions on a first interface of the communication application according to the P pieces of state information, wherein
- a display manner of each session identifier is associated with state information of a session corresponding to the session identifier; and the state information of the session is used to represent a state of a chat dialogue in the session, the state information of the session comprises first state information and second state information, the first state information is used to represent that the chat dialogue in the session is in an incomplete state, and the second state information is used to represent that the chat dialogue in the session is in a completed state; wherein
the program or the instruction, when executed by the processor, causes the electronic device to perform:
- determining Q first sessions in the P sessions according to the P pieces of state information, wherein state information of a first session is the first state information, and Q is an integer less than or equal to P;
- determining Q target objects corresponding to the Q first sessions, wherein a target object is an object that needs to reply to a message in the first session; and
- displaying Q session identifiers corresponding to the Q first sessions on the first interface of the communication application according to the Q target objects.

18. The non-transitory readable storage medium according to claim 17, wherein the program or the instruction, when executed by the processor, causes the electronic device to perform:

obtaining end information of an i-th session in the communication application, wherein a value range of i is from 1 to P, and i is an integer;

matching the end information with N pieces of pre-obtained storage information to obtain a matching result, wherein the N pieces of storage information are used to identify that state information is the first state information, and N is a positive integer; and determining state information of the i-th session according to the matching result, wherein the N pieces of storage information comprises at least one of: a keyword used to identify that state information is an incomplete state, or a statement used to identify that state information is an incomplete state.

19. The non-transitory readable storage medium according to claim 18, wherein in a case that the matching result is that there is storage information matching the end information in the N pieces of storage information, the state information of the i-th session is determined as the first state information; and in a case that the matching result is that there is no storage information matching the end information in the N pieces of storage information, the state information of the i-th session is determined as the second state information.

20. The non-transitory readable storage medium according to claim 17, wherein the first session comprises at least one of a first sub-session or a second sub-session, a target object corresponding to the first sub-session is a login object of the communication application, and a target object corresponding to the second sub-session is not a login object of the communication application; and the program or the instruction, when executed by the processor, causes the electronic device to perform at least one of:

displaying a session identifier corresponding to the first sub-session on the first interface of the communication application in a third display manner; or displaying a session identifier corresponding to the second sub-session on the first interface of the communication application in a fourth display manner.

* * * * *